United States Patent [19]

Bevilaqua et al.

[11] Patent Number: 4,519,990

[45] Date of Patent: May 28, 1985

[54] SPRAY DRYER FOR THE PURIFICATION OF A GAS

[75] Inventors: Paul M. Bevilaqua, Dublin, Ohio; Stanley J. Stachura, Woodland Hills, Calif.

[73] Assignee: Rockwell International Corporation, El Segundo, Calif.

[21] Appl. No.: 497,617

[22] Filed: May 24, 1983

[51] Int. Cl.³ ............................................ B01D 1/16

[52] U.S. Cl. ........................................ 423/210; 34/29; 55/82; 55/92; 55/238; 55/261; 55/312; 55/457; 159/4 B; 159/4 D; 159/4 J; 159/4 S; 159/48.1; 422/168; 423/242

[58] Field of Search ...................... 159/48.1, 4 A, 4 R, 159/4 S, 4 B; 422/169, 170, 172, 168; 423/242 A, 210; 34/29; 55/261, 238, 312, 457

[56] References Cited

U.S. PATENT DOCUMENTS

| | | | |
|---|---|---|---|
| 1,417,083 | 5/1922 | MacLachlan | 159/4.5 |
| 1,989,406 | 1/1935 | Doolittle | 159/4 |
| 2,081,909 | 6/1937 | Bowen | 159/4 |
| 2,222,396 | 11/1940 | Bowen | 34/34 |
| 2,473,035 | 6/1949 | Meade et al. | 159/4.5 |
| 2,575,119 | 11/1951 | Peebles et al. | 159/48 |
| 2,936,043 | 5/1960 | Armstrong et al. | 55/457 |
| 3,304,694 | 2/1967 | Manger et al. | 55/238 |
| 3,616,619 | 11/1971 | Klein | 55/457 |
| 3,669,425 | 6/1972 | Copeland | 55/238 |
| 3,720,314 | 3/1973 | Phillippi | 55/261 |
| 3,895,994 | 7/1975 | Saguchi et al. | 159/4 R |
| 3,932,587 | 1/1976 | Grantham et al. | 423/242 |
| 4,176,083 | 11/1979 | McGovern et al. | 55/261 |
| 4,197,278 | 4/1980 | Gehri et al. | 423/242 |
| 4,226,603 | 10/1980 | Larsson et al. | 159/4 B |
| 4,301,128 | 11/1981 | Hastrup | 159/4 A |

*Primary Examiner*—Barry S. Richman
*Assistant Examiner*—John Donofrio
*Attorney, Agent, or Firm*—H. Fredrick Hamann; Harry B. Field

[57] ABSTRACT

A spray dryer apparatus for contacting a hot gas stream containing gaseous impurities with an aqueous medium containing an absorbent for the impurities to produce a gas stream of reduced impurity content and dried powder products. The apparatus includes a chamber formed symmetrically about a vertical axis and an atomizer means located in an upper portion of the chamber for introducing a finely dispersed spray of the aqueous medium, a conduit for delivering the hot gas stream to the chamber and a gas injection means for receiving a major portion of the hot gas stream from the conduit and introducing it circumferentially about the atomizer means. The gas injection means imparts both axial and angular velocity components to the major portion of the hot gas stream whereby the hot gas stream swirls downwardly through the chamber.

The apparatus provides a bypass means for withdrawing a minor portion (about 5 to 25 vol. %) of the hot gas stream from the conduit and a duct for introducing the withdrawn minor portion of hot gas into the chamber at a tangent to a radius extending from the vertical axis and in a substantially horizontal plane. An essential feature of the invention is that the minor portion of the hot gas is introduced into the chamber in a direction counter to the direction of swirl of the major portion of the hot gas passing downwardly through the chamber.

20 Claims, 7 Drawing Figures

Fig.2.
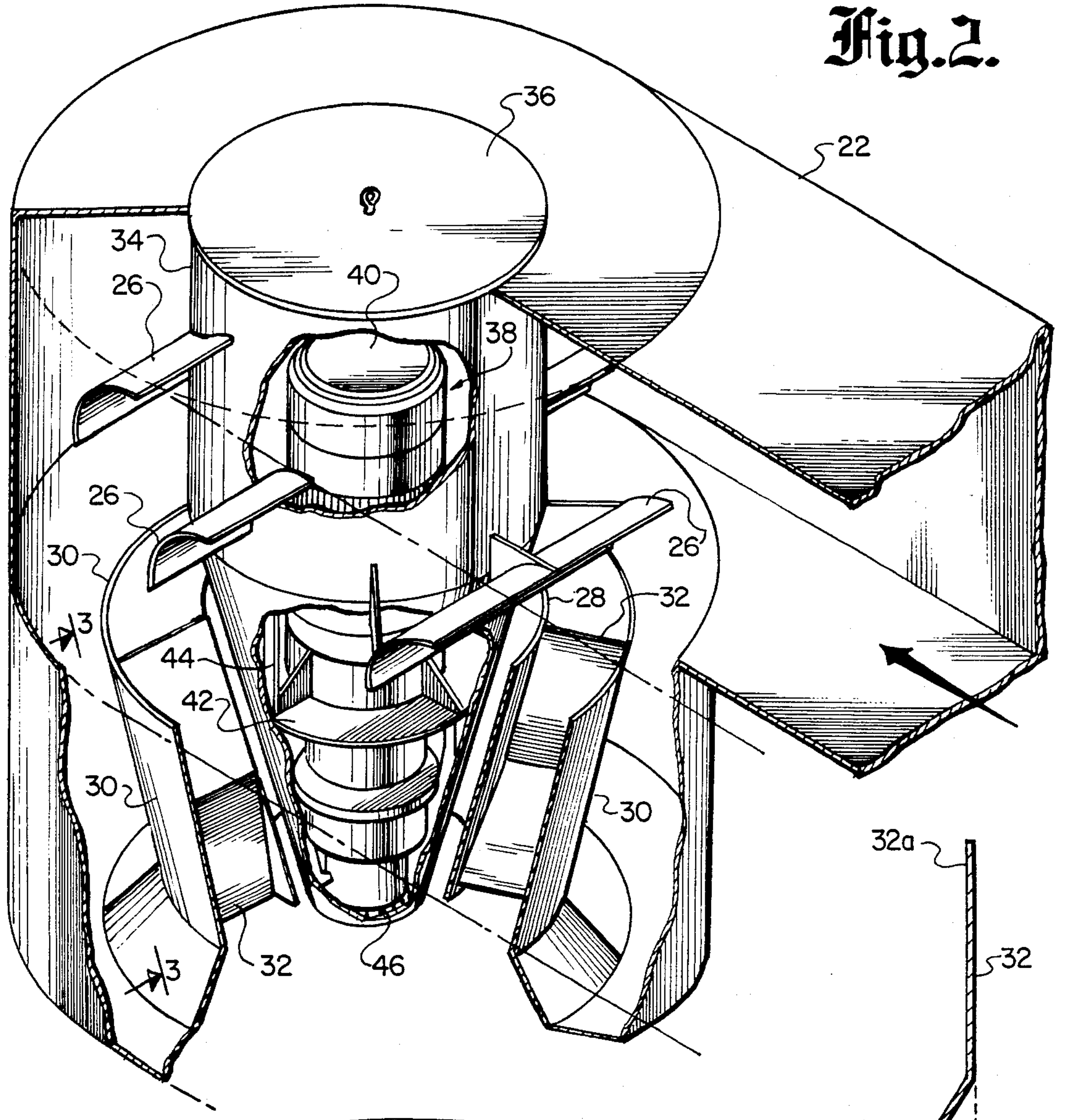
Fig.3.
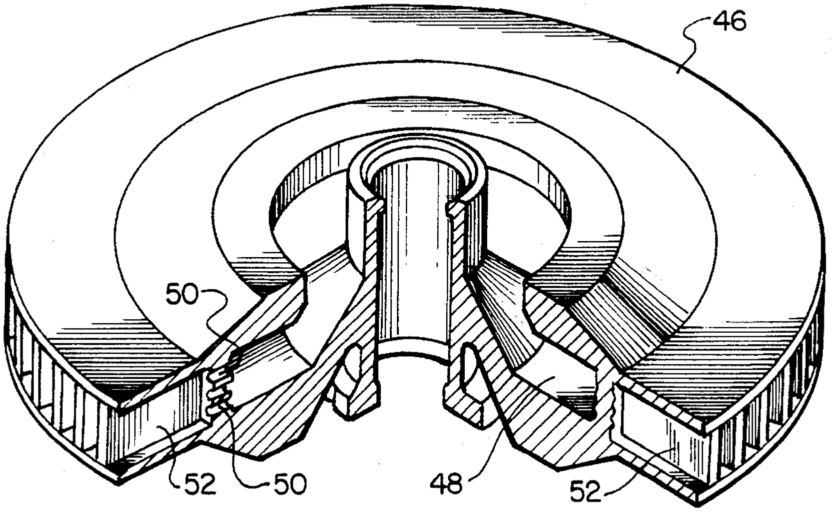
Fig.4.

SPRAY DRYER FOR THE PURIFICATION OF A GAS

The present invention relates to a spray dryer apparatus. It particularly relates to such an apparatus adapted for use in contacting a hot gas stream containing impurities with an aqueous medium containing an absorbent for such impurities.

Spray drying has been practiced in the food industry for a considerable length of time in the production of various dry foods such as cereals, powdered milk, and the like. For example, in a 1935 patent (U.S. Pat. No. 1,989,406) there is disclosed a spray drying apparatus of the type in which the wet material to be dried is brought into contact with a heat carrying medium to remove the moisture and produce a final dry powder product. The apparatus comprises a drying chamber, an inlet for the material to be dried and an atomizing means for atomizing the material to be dried. It also includes means for circulating gases and vapors within the chamber in a substantially spiral path. The chamber is provided with an outlet for the gases, means for recompressing the gases and means for returning the compressed gases to the chamber through a jacket which partially surrounds the chamber.

U.S. Pat. No. 2,081,909 describes a spray dryer apparatus which has as its object the avoidance of the accumulation of dry products on the walls of the chamber. The apparatus described therein comprises a chamber provided with means at the top for the introduction of the substance to be dried. It further includes means for introducing a drying medium into the chamber and means for removing the substance and drying medium from adjacent the bottom of the chamber. To avoid the accumulation of mateial on the walls of the chamber it is taught to introduce a plurality of fluid streams into the chamber along the sides thereof to form a rotating fluid wall therein.

U.S. Pat. No. 2,222,396 discloses another spray dryer chamber in which the object is to avoid forming undesirable layers of solid material on the surfaces of the drying chamber. The apparatus disclosed comprises a chamber having a slot therein, means to introduce atomizing fluid into the chamber and means for directing an axial moving and rotating column of air over the moisture laden particles to form a vortex. The apparatus further includes a scroll casing on the chamber cooperating with the slot for directing air into the chamber inwardly and off a tangent of the periphery of the chamber for confining the vortex centrally therein.

In U.S. Pat. No. 2,575,119 there is disclosed a sray dryer apparatus in which one object was to maintain free flight of the atomized material within the chamber without permitting the material discharged at high velocity in a horizontal plane from the atomizing device to directly impact on the heated walls of the chamber. In accordance with the invention disclosed, the spray dryer includes a substantially cylindrical chamber having a plurality of ducts adapted to receive hot primary drying gas and communicating with the upper part of the chamber. The ducts are spaced circumferentially about the chamber at regularly spaced intervals and disposed to discharge on an axis which is in a horizontal plane and coincident with the plane in which the atomizing device of the spray dryer projects particles. The axis of each duct is directed chordally of the chamber and intersecting the axis of a jet issuing from an adjacent duct. All of the ducts discharge in a zone which is confined to the proximity of a common plane.

Recently it has been suggested that a spray dryer apparatus also could be used for contacting gas streams containing impurities with an aqueous medium containing an absorbent for the impurities to produce a substantially pure gas stream and a dry flowable powder product. For example, U.S. Pat. Nos. 4,197,278 and 3,932,587 describe the use of spray dryers for removing sulfur oxide impurities from gas streams containing the same and fly ash. When used for such applications some of the same problems encountered in processing foods also are encountered with the cleaning of such gas streams. However, when treating a sulfur and fly ash containing gas stream with an absorbent such as calcium or sodium carbonate the problem is far more severe. Specifically, the fly ash interacts with the absorbent and sulfur constituents such that the deposits formed on the wall have physical characteristics similar to that of concrete. Such deposits are, of course, extremely difficult and time consuming to remove.

It has been the practice heretofore to take great care to avoid the formation of such deposits. To avoid such deposits requires that the gas be discharged from the spray dryer at a temperature substantially above its adiabatic saturation temperature. Such practice, however, imposes a serious economic penalty on the process. Specifically, the effectiveness of most absorbents for removing impurities such as sulfur oxides increases as the adiabatic saturation temperature is approached. When the spray dryer is operated such that the effluent gas is substantially above its adiabatic saturation temperature to avoid the formation of deposits on the dryer walls, the amount of absorbent required to remove the same amount of sulfur oxide increases, i.e., the absorbent utilization decreases. The net result is, of course, a substantial amount of unreacted absorbent remains in the dried powder product. This unreacted absorbent generally is discarded as waste since its recovery from the reaction products and ash constituents of the gas is prohibitively expensive. Moreover, even in processes where the reacted absorbent is regenerated, the presence of substantial quantities of unreacted absorbent add considerably to the amount of materials which must be processed.

Clearly, therefore, there exists a need for an improved spray dryer for use in the treatment of waste gas streams to remove gaseous impurities which will operate closely to the adiabatic saturation temperature of the effluent gas produced without the formation of undesirable deposits on the walls of the dryer and any downstream ducting.

SUMMARY OF THE INVENTION

The present invention provides a spray dryer apparatus for contacting a hot gas stream containing gaseous impurities with a liquid medium containing an absorbent for the impurities to produce a gas stream of reduced impurity content and dry powder products. It is a particular advantage of the present invention that the gas stream may be discharged from the spray dryer at a temperature close to its adiabatic saturation temperature while concurrently maintaining the powder products in a dry state such that the interior surfaces of the apparatus remain free of any significant deposits of reaction products.

The appartus comprises a chamber formed symmetrically about a vertical axis and has an atomizer means located adjacent an upper portion of the chamber for introducing a finely dispersed spray of the aqueous medium. A conduit is provided for delivery of the hot gas stream to the chamber and to a gas injection means for receiving a major portion of the hot gas stream from the conduit and introducing it circumferentially about the atomizer means. The gas injection means imparts both axial and angular velocity components to the major portion of the hot gas stream whereby the hot gas stream swirls downwardly through the chamber. A key aspect of the present invention is a bypass means which provides for the withdrawal of a minor portion of the hot gas stream from the conduit and delivering it to a duct means. The duct means introduces the withdrawn minor portion of the hot gas stream into the chamber at a tangent to a radius extending from the vertical axis, in a substantially horizontal plane and in a direction counter to the direction of swirl of the major portion of the hot gas stream passing downwardly through the chamber.

In accordance with one of the preferred embodiments of the invention the bypass means provides for the withdrawal from 5 to 25 vol. % and preferably 10 to 15 vol. % of the gas to be treated. In accordance with another preferred embodiment the atomizing means comprises a rotating disc arranged to project the aqueous medium outwardly in a substantially horizontal plane. In another embodiment of the invention the gas injection means comprises a substantially horizontal inner ring member surrounding the atomizer means, an outer horizontal ring member circumferentially surrounding said first ring member and spaced apart therefrom, and a plurality of radially extending vane members disposed intermediate the ring members. The vane members have at least a lower portion thereof formed to discharge the gas at an angle within the range from about 40° to 50° to the vertical axis and impart both axial and angular velocity components to the major portion of the hot gas stream.

The present invention is particularly adapted to the treatment of hot gas streams containing sulfur oxide impurities with an aqueous medium containing an alkali absorbent for the impurities to produce a gas stream of reduced sulfur oxide content and dry reaction products including reacted, partially reacted and unreacted absorbent. Such gas streams frequently are generated in large quantities, such as the effluent gas from a utility boiler. In such instance, the chamber advantageously is sized to accommodate an array of atomizer means, each of which is provided with a gas injection means. The atomizer and gas injection means generally will be arranged in a symmetrical array substantially equidistant from one another, the vertical axis and the interior walls of the chamber.

Additional aspects and advantages of the invention will be readily apparent from the following description in which a preferred embodiment has been set forth in detail in conjunction with the accompanying drawings.

BRIEF DESCRIPTION OF THE DRAWINGS

FIG. 2 is an isometric view partially broken away to show a typical gas injection means and atomizer means of the apparatus of FIG. 1 taken along the line 2—2;

FIG. 3 is an edge view of a typical vane member for imparting axial and angular velocity components to a gas stream taken along line 3—3 of FIG. 2;

FIG. 4 is an isometric view of a typical atomizer wheel partially broken away to show fluid passageways;

DETAILED DESCRIPTION OF THE INVENTION

The present invention will now be described with reference to a particularly preferred application, namely the treatment of hot gas streams containing gaseous impurities with an aqueous medium containing an absorbent for the impurities to produce a gas stream of reduced impurity content and dry powder products. More specifically, the invention will be described with reference to the removal of sulfur oxides from a flue gas produced by the burning of a sulfur containing fuel such as coal. The flue gas is contacted with a finely dispersed spray of a selected absorbent for the sulfur oxides. Generally, the absorbent will be selected from the group consisting of calcium oxide, calcium hydroxide, sodium carbonate, sodium bicarbonate and sodium hydroxide.

Figure 1:
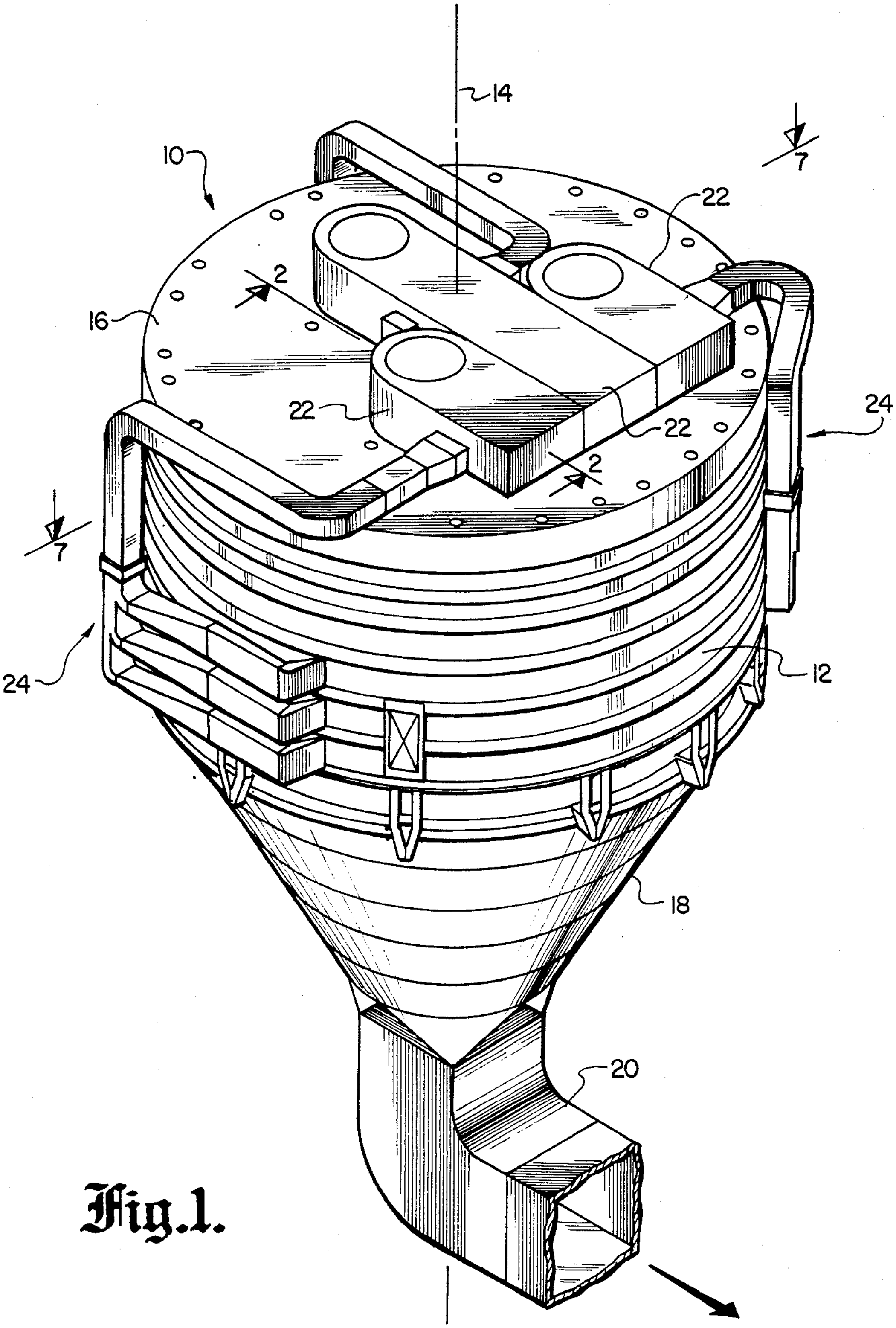
FIG. 1 is an isometric view of an apparatus constructed in accordance with the present invention.

Referring now to FIG. 1, therein is depicted a spray dryer apparatus constructed in accordance with the present invention. Spray dryer apparatus 10 comprises a wall member 12 formed symmetrically about a vertical axis 14 to define a substantially cylindrical chamber which is closed at its top end by a cover member 16. Wall member 12 terminates at its lower end in a conehhaped member 18. Cone-shaped member 18 terminates at its lower end in a discharge duct 20 which serves to collect and discharge gas and powder products which pass therethrough. Adjacent an upper portion of spray dryer apparatus 10 there is provided a plurality of conduit members 22 for the introduction of the gas to be treated in spray dryer 10 in a manner which will be described in more detail later. Spray dryer apparatus 10 also includes as a key feature of the invention a by-pass duct assembly 24 which will be described in more detail with reference to FIGS. 5-7.

Referring now to FIGS. 2-4, it will be seen how a major portion of the gas to be treated and the liquid absorbent are brought into contact with one another. Referring to FIG. 2 in particular it is seen that located within conduit member 22 are a plurality of deflectors 26 which are located above a gas injection means generally referred to as a vane ring. The vane ring comprises inner and outer ring members 28 and 30 respectively which are interconnected by a plurality of radially extending vane members 32. As shown in FIG. 3 vane members 32 have upper and lower portions 32_a_ and 32_b_ respectively. At least the lower portion of each vane member is inclined with respect to a vertical axis at an angle $\theta$ which will generally be within the range of from about 40° to 50° and preferably is about 45°. The function of the inclined portion is, of course, to impart both radial and axial velocity components to gas passing thereover. As depicted, vane members 32 are formed in two flat portions for ease of construction and assembly. It will be appreciated by those versed in the art, however, that vane members 32 could be curved to form an air foil to accomplish the transition from axial flow to a combination of both axial and angular flow. Thus, the precise configuration of the vane members is not critical provided, of course, that the gas passing thereover is discharged at an angle within the range of 40° to 50°.

Also located within member 22 is a housing 34 which is closed at its upper end with a removable cover 36. Located within housing 34 is a spray machine 38 which includes a motor 40 supported within housing 34 on a support means 42. Also located within housing 34 is a fluid supply line 44 for supplying fluid to a liquid manifold (not shown) located within spray machine 38. Spray machine 38 terminates at its lower end in an atomizing or spray disc 46. Referring to FIG. 4 it is seen that spray disc 46 is provided with an internal passageway 48 (which is in fluid communication with the liquid manifold) and aperatures 50 which provide fluid communication to a radial array of atomizing vanes 52.

Figure 5:
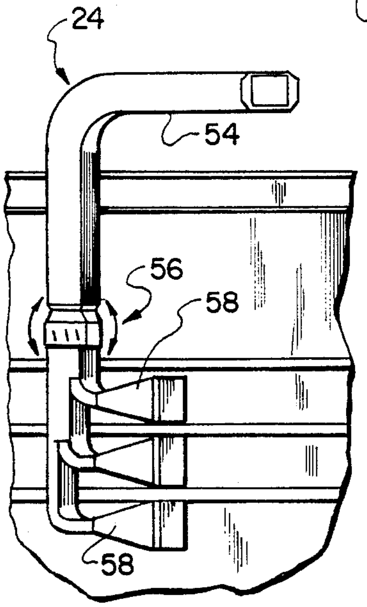
FIG. 5 is an elevation view partially broken away showing a typical duct arrangement for bypassing a portion of the hot gas.

FIG. 5 shows a typical bypass duct assembly 24 which comprises a main duct 54, a plurality of damper assemblies 56 and a plurality of gas injection ducts 58.

Figure 6:
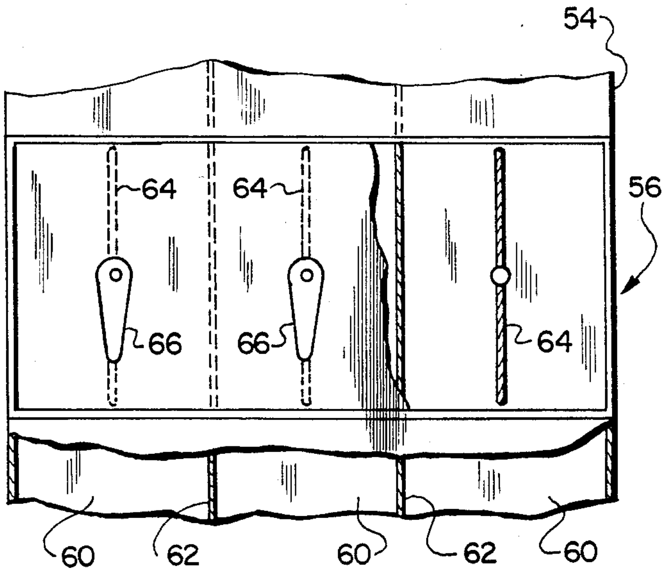
FIG. 6 is an enlarged elevation view partially in phantom to show a typical damper arrangement for use in the duct shown in FIG. 5.

Referring now to FIG. 6, it is seen that main duct 54 is broken up over at a least a portion of its length into three substantially identical passageways 60 by partitions 62 to insure a uniform flow of gas to each of gas injection ducts 58. Each of passageways 60 is provided with a damper assembly 56 which comprises a damper plate 64 rotatable by a damper control 66 between a fully open position in which gas flow is substantially unimpeded and a fully closed position in which gas flow is obstructed. This provides a means for regulating not only the total amount of gas flowing through bypass duct assembly 24 but also a means of regulating the amount of gas introduced into the spray dryer apparatus through each of the individual gas injection ducts 58 for optimum results.

In operation, an aqueous medium containing an absorbent is introduced into spray machine 38 through fluid supply line 44 and emerges through the passageways of spray disc 46 as a finely dispersed horizontal spray. Typically, spray disc 46 is rotated at from about 15–20,000 rpm to insure a finely dispersed spray of small droplets. A major portion of the hot gas to be treated passes through conduit member 22 and downwardly through the vane ring. Vanes 32 impart both axial and angular velocity components to the hot gas stream such that there is formed a downwardly descending swirl of hot gas through the chamber.

The vane ring configuration is selected such that it will impart to the gas a swirl number of from about 0.6 to 1.2 and preferably about 0.7. It must be appreciated that within this range of swirl numbers there is a significant difference in the flow pattern within the chamber. Specifically, below this range the gases tend to flow downwardly in a spiral form. When the swirl number exceeds 1.2 the centrifuging effect becomes so great that deposits form on the walls. Within the range there is an abrupt change in flow pattern which then becomes what might best be described as a recirculating vortex in which some portion of the gas during its passage through the chamber will at times have an upward velocity component. Thus, within the claimed range of swirl members substantially the entire volume of the chamber is utilized for mixing and drying.

As used herein the swirl member is defined as the ratio of the angular momentum to the axial momentum times the radius of the outer ring member 30. It will be appreciated that, since the angular and axial mass will be substantially identical for all practical purposes, the swirl number may be calculated as the ratio of angular velocity to the axial velocity times the radius of the outer ring member 30. When the cross-sectional flow area between inner and outer ring members 28 and 30 is substantially constant the desired swirl number will be obtained when the gas is discharged at an angle between about 40° and 50° to the vertical axis. However, when the inner and outer ring members provide cross-sectional flow area that decreases in a downwardly direction the angle may be larger. Conversely, if the inner and outer ring members provide a cross-sectional flow area which increases in a downwardly direction then it is possible to use a lesser angle and still obtain the desired swirl number. Within the foregoing range of swirl numbers it has been found that the spray dryer apparatus outlet gas temperature may be reduced 5° closer to the adiabatic saturation temperature than would otherwise be possible without the formation of objectionable deposits.

About 5 to 25 vol. % of the hot gas to be treated is withdrawn from conduit member 22 through bypass duct assemblies 24 and introduced into the spray dryer apparatus below the level of spray disc 46. Preferably, the bypass portion of gas is introduced at several points about the lower two-thirds of wall member 12.

Figure 7:
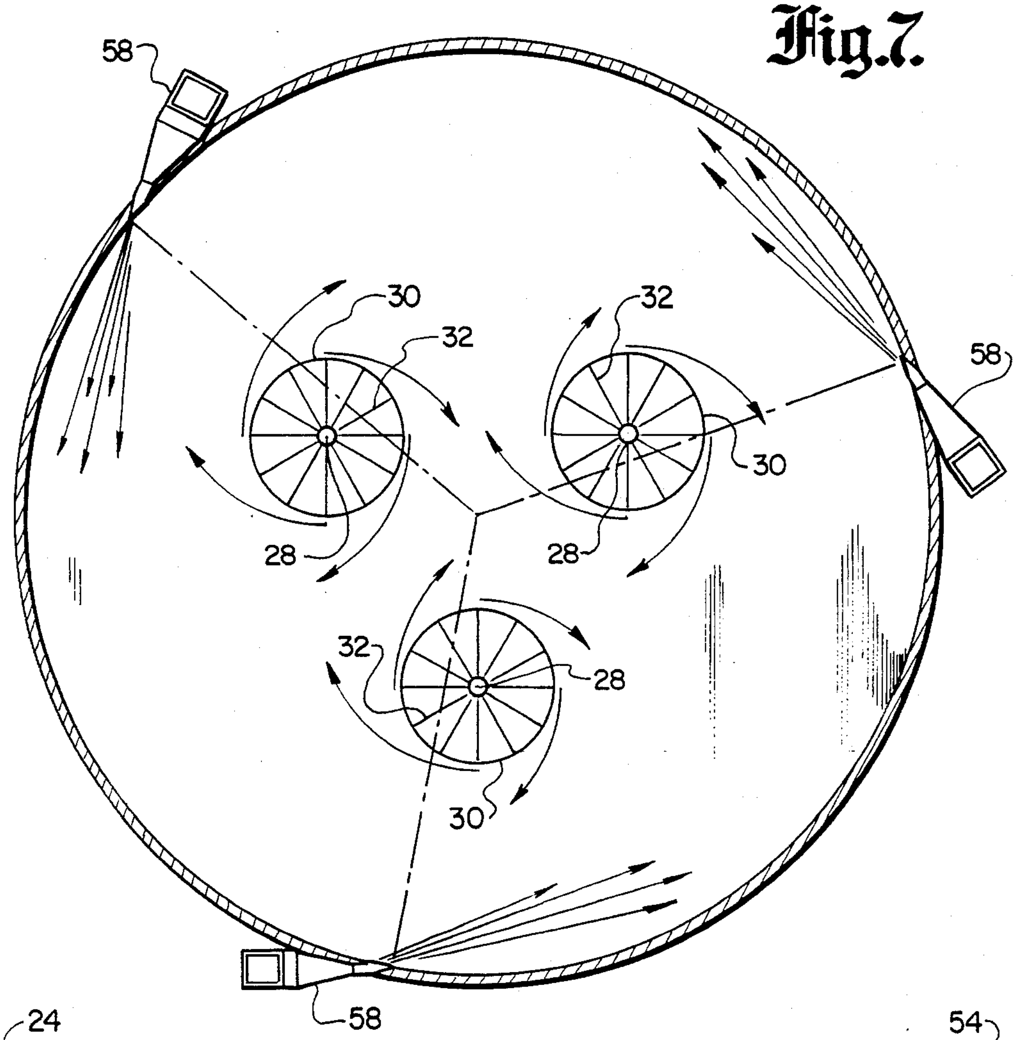
FIG. 7 is a schematic plan view of the apparatus shown in FIG. 1 taken along the line 7—7.

Referring now to FIG. 7, therein is shown schematically how the vane rings impart a swirling motion to the main portion of gas which rotates as indicated by the arrows in a clockwise direction. It is a key feature of the present invention that the gas which is introduced through bypass duct assembly 24 is injected in a direction opposite or counter to that of the swirling stream of the main portion of gas. Thus, in accordance with the present invention the bypass portion of gas is introduced through injection ducts 58 substantially at a tangent to a radius extending from the vertical axis of the spray dryer apparatus and in a substantially horizontal plane. This reverse sweep of the bypass portion of hot gas permits the allowable outlet gas temperature to approach the adiabatic saturation temperature by from about 25°–35° F. closer than would otherwise be possible without the formation of objectionable deposits in the chamber.

It further has been determined that an additional 10° lower allowable outlet gas temperature may be obtained by biasing the location of the spray machines and vane rings slightly towards the center of the chamber. Thus, rather than having the center line of each spray machine and its associated vane ring exactly in between the axial center line of the chamber and the chamber wall, they may be displaced towards the vertical center line by about 10–20% of the distance from center line to chamber wall. For example, for a spray dryer apparatus having a 46–48′ diameter chamber each spray machine and its associated vane ring will be located approximately 3 feet closer to the vertical axis than to the nearest chamber wall. Accordingly rather than locating the spray machines and vane rings exactly equidistant the center line and chamber wall, they are located substantially equidistant, i.e., displaced slightly towards the center line.

Another advantage of an apparatus constructed in accordance with the present inventon is that the ratio of the height of the cylindrical section such as wall member 12 to the diameter of the cylindrical section may be substantially reduced. More particularly, most prior art of spray dryers had a ratio of height to diameter of the cylindrical section substantially greater than 1. However, in the apparatus of the present invention such ratio of height to diameter is less than 1. Thus, the present invention provides a spray dryer apparatus which is substantially more compact with a corresponding reduction in the cost of the apparatus.

The present invention was tested at a commercial 410 MWe utility power plant. Initially, four spray dryers of substantially conventional design were provided, each spray dryer being 46′ in diameter and having three atomizing machines. Each machine included an 8″ disc driven at about 18,000 rpm. The purpose of the spray dryers was to remove sulfur oxides from the utility power plant flue gas by contacting the gas with an aqueous solution of sodium carbonate. During the initial operation substantial problems were encountered. Specifically, when the exit gas from the spray dryer approached its adiabatic saturation temperature, where the best adsorbent utilization and sulfur oxide removal occurs, substantial deposits formed within the spray dryer apparatus and the downstream ducting. These deposits required shutdown of the facility to permit their removal.

To avoid the formation of such deposits it was necessary to operate the facility such that the temperature of the gas leaving the spray dryer was maintained at about 110° F. above its adiabatic saturation temperature. This high outlet gas temperature substantially alleviated the problems of deposits forming within the chamber. However, at such high outlet gas temperatures the facility was unable to remove the required amount of sulfur oxides with the desired absorbent utilization.

Subsequently, the spray dryers were modified in accordance with the present invention such that the incoming main portion of the gas to be treated had a swirl number of about 0.7 and about 10% of the gas was bypassed and introduced into a lower portion of the spray dryer in a direction countercurrent to the primary swirl of gas passing therethrough. Thereafter, the units were placed back in operation and it was possible to reduce the gas outlet temperature to a level such that the desired performance levels with respect to $SO_2$ removal and absorbent utilization were met or exceeded. Further, this was accomplished without the formation of any undesirable deposits in the chamber or the associated ducts. Thus, the efficacy of the present invention has been established on a commercial scale.

It will, of course, be realized that many variations and configurations may be used in the practice of the invention within the limits of the critical parameters set forth. Thus, the present invention may be used for applications other than the preferred embodiment, for example, removing other gaseous impurities with other absorbents. Indeed, the present invention should find considerable utility in such prior art processes as the drying of foods. Further, it will be appreciated that various configurations and arrangements of spray dryers and types of atomizing machines may be utilized. Thus, while the description illustrating the invention has been described with respect to certain preferred specific structural arrangements and applications and what is now considered to represent its best embodiment has been illustrated and described, the invention may be otherwise practiced within the scope of the teaching set forth as will be readily apparent to those skilled in this art. Accordingly, the invention is not to be limited by these illustrative and specific embodiments thereof but its scope should be determined in accordance with the following claims.

What is claimed is:

1. A spray dryer apparatus for contacting a hot gas stream containing gaseous impurities with an aqueous medium containing an absorbent for the impurities to produce a gas stream of reduced impurity content and dry powder products, said apparatus comprising:

- a chamber formed symmetrically about a vertical axis;
- atomizer means located in an upper portion of said chamber for introducing a finely dispersed spray of said aqueous medium;
- conduit means for delivering said hot gas stream to said chamber;
- gas injection means for receiving a major portion of said hot gas stream from said conduit means and introducing it circumferentially about said atomizer means, said gas injection means imparting both axial and angular velocity components to said major portion of said hot gas stream whereby said hot gas stream swirls downwardly through said chamber;
- bypass means for withdrawing a minor portion of said hot gas stream from said conduit means; and
- duct means for introducing said withdrawn minor portion of said hot gas stream into said chamber at a tangent to a radius extending from said vertical axis, in a substantially horizontal plane and in a direction counter to the direction of swirl of said major portion of said hot gas stream passing downwardly through said chamber.

2. The apparatus of claim 1 wherein said bypass means provides for withdrawing from 5 to 25 vol. % of said hot gas stream.

3. The apparatus of claim 1 wherein said bypass means provides for withdrawing 10–15 vol. % of said hot gas stream.

4. The apparatus of claim 1 wherein said atomizing means comprises a rotating disc arranged to project the aqueous medium outwardly in a substantially horizontal plane.

5. The apparatus of claim 4 wherein said gas injection means comprises an inner ring member surrounding said atomizing means, an outer ring member circumferentially surrounding said inner ring member and a plurality of radially extending vane members disposed intermediate said ring members, said vane members having at least a lower portion formed for discharging gas at an angle within the range of from about 40° to 50° to said vertical axis.

6. The apparatus of claim 5 wherein said vane members are inclined at an angle of about 45° to said vertical axis.

7. The apparatus of claim 1 wherein said duct means provides for the introduction of said minor portion of said hot gas stream into said chamber below said atomizing means.

8. The apparatus of claim 7 wherein said duct means provides for the introduction of said minor portion of said hot gas stream into said chamber at a plurality of points about its periphery.

9. The apparatus of claim 8 wherein said duct means provides for the introduction of said minor portion of said hot gas stream at a plurality of points located in the lower two-thirds of the chamber.

10. The apparatus of claim 9 wherein said spray dryer apparatus includes a gas and dry powder product collection portion adjacent a lower end of said chamber for the collection and withdrawal of gas and dry powder products.

11. A spray dryer for contacting a hot gas stream containing sulfur oxide impurities with an aqueous medium containing an alkali absorbent for the impurities to produce a gas stream of reduced sulfur oxide content and dry powder products including reacted, partially reacted and unreacted absorbent, said apparatus comprising:

a chamber having a substantially cylindrical wall member formed symmetrically about a vertical axis;

an array of atomizer means located adjacent an upper portion of said chamber for introducing a finely dispersed spray of said aqueous medium into said chamber;

conduit means for delivering said hot gas stream to said chamber;

a plurality of gas injection means equal in number to said atomizer means for receiving a major portion of said hot gas stream from said conduit means and introducing it circumferentially about each of said atomizer means, said gas injection means imparting both axial and angular velocity components to said major portion of said hot gas stream whereby said hot gas stream swirls downwardly through said chamber;

bypass means for withdrawing a minor portion of from about 5 to 25 vol. % of said hot gas stream from said conduit means; and duct means for introducing said minor portion of said hot gas stream into said chamber below said atomizer means, at a tangent to a radius extending from said vertical axis, in a substantially horizontal plane and in a direction counter to the swirl of said hot gas passing downwardly through said chamber.

12. The apparatus of claim 11 wherein each of said gas injection means comprises a substantially horizontal inner ring member surrounding said atomizing means, a substantially horizontal outer ring member circumferentially surrounding said inner ring member and a plurality of radially extending vane members disposed intermediate said ring members, said vane members having at least a lower portion formed to discharge gas at an angle within the range of from about 40° to 50° to said vertical axis.

13. The apparatus of claim 12 wherein said lower portion of said vane is flat and inclined at an angle of about 45° to said vertical axis.

14. The apparatus of claim 12 wherein each of said array of atomizer means comprises a rotating disc arranged to project the aqueous medium outwardly in a substantially horizontal plane.

15. The apparatus of claim 14 wherein said array of atomizer means comprises three atomizer means located about said vertical axis at 120° intervals and each of said atomizer means is substantially equidistant from said chamber wall member and said vertical axis.

16. The apparatus of claim 15 wherein said chamber has a height-to-diameter ratio of less than about 1:1.

17. The apparatus of claim 16 further including means located adjacent a bottom portion of said chamber for the collection and withdrawal of the gas stream of reduced sulfur oxide content and dry powder products.

18. A method of treating a hot gas stream containing gaseous impurities with an aqueous medium containing an absorbent for the impurities to produce a gas stream of reduced impurity content and dry powder products comprising:

introducing said aqueous medium into a chamber formed symmetrically about a vertical axis, said aqueous medium being introduced as a finely dispersed spray into an upper portion of said chamber;

introducing a major portion of the hot gas stream containing gaseous impurities into said chamber and circumferentially about said finely dispersed spray, said major portion of hot gas being introduced in a downwardly descending swirl through said chamber; and introducing a minor portion of the hot gas stream into said chamber about the periphery thereof, at a tangent to a radius extending from said vertical axis, in a substantially horizontal plane and in a direction counter to the direction of swirl of the major portion of hot gas passing through said chamber.

19. The method of claim 18 wherein said minor portion of the hot gas stream comprises from 5–25 vol. % of the hot gas stream to be treated.

20. The method of claim 19 wherein said minor portion of said hot gas stream is introduced into said chamber below the level at which the finely dispersed spray of aqueous medium is introduced.

* * * * *